United States Patent [19]

Soga

[11] Patent Number: 4,977,308
[45] Date of Patent: Dec. 11, 1990

[54] HEAT ROLLER TYPE FIXING DEVICE AND METHOD OF PRODUCING THE SAME

[75] Inventor: Setsuo Soga, Tokyo, Japan

[73] Assignee: Ricoh Company, Ltd., Tokyo, Japan

[21] Appl. No.: 209,217

[22] Filed: Jun. 20, 1988

[30] Foreign Application Priority Data

Jun. 22, 1987 [JP] Japan .................................. 62-153417
Mar. 16, 1988 [JP] Japan .................................. 63-60295

[51] Int. Cl.$^5$ ............................................. G03G 15/20
[52] U.S. Cl. ................................... 219/469; 219/216; 524/267; 524/268; 355/290
[58] Field of Search ......................... 219/216, 469–471; 524/267, 268; 29/132; 355/290

[56] References Cited

U.S. PATENT DOCUMENTS 3,936,578  2/1976  Dumoulin ........................... 524/268
4,585,705  4/1986  Broderick ........................... 524/268

FOREIGN PATENT DOCUMENTS 697523  11/1964  Canada ................................. 524/267
3329158  2/1985  Fed. Rep. of Germany ...... 524/267
766623   1/1957  United Kingdom ................ 524/267
781488   8/1957  United Kingdom ................ 524/267

Primary Examiner—Teresa J. Walberg
Attorney, Agent, or Firm—Oblon, Spivak, McClelland, Maier & Neustadt

[57] ABSTRACT

A heat roller type fixing device having a fixing roller and a pressing roller and applicable to an electrophotographic copier or like image forming apparatus, and a method of producing the same. The pressing roller is produced such that the content of 3- to 15-mer, preferably 3- to 10-mer, low-molecular weight siloxanes (oligomers) which are contained in the roller is less than 300 parts per million. While the fixing device is in operation, chargers built in the image forming apparatus are prevented from being whitened by pologomers which are evaporated from the pressing roller.

2 Claims, 1 Drawing Sheet

HEAT ROLLER TYPE FIXING DEVICE AND METHOD OF PRODUCING THE SAME

BACKGROUND OF THE INVENTION

The present invention relates to a fixing device applicable to an electrophotographic copier or like image forming apparatus for fixing a toner image which is provided on a paper and, more particularly, to a heat roller type fixing device having a fixing roller and a pressing roller which is rotatable in pressing contact with the fixing roller, and a method of producing the same.

A heat roller type fixing device is extensively used with a copier, facsimile apparatus, printer or similar image forming apparatus. An image forming apparatus includes a number of devices in addition to the fixing device. I conducted a series of experiments to find out an implementation for freeing images produced by an image forming apparatus from various kinds of defects. The experiments showed that one of major factors which effect an image is the characteristics of a heat roller type fixing device used. By studying various heat roller type fixing devices one by one, I found the following fact. When a pressing roller of a heat roller type fixing device is heated by a fixing roller, 3- to 15-mer low-molecular weight siloxanes (oligomers) are evaporated to adhere to other devices such as chargers (especially corona wires of chargers). The vapor of siloxanes adhered to chargers is burned to become silica ($SiO_2$) which obstructs the discharge of the chargers. For example, $SiO_2$ on a charger which is adapted to uniformly charge a photoconductive element lowers the total ability of the charger and/or renders the charge distribution irregular, resulting in an incomplete image. The current trend in the imaging art is toward a miniature image forming apparatus. In a miniature image forming apparatus, an ample space for oligomers evaporated from the pressing roller to be scattered is not available so that the amount of $SiO_2$ deposited on the chargers and others is increased. It is to be noted that tetramer which is an example of the above-mentioned 3- to 15-mers has four Si—O and is expressed as:

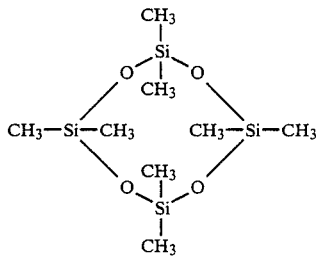

The problem discussed above may be solved by a mechanical implementation such as coating the surface of the pressing roller with Teflon or causing oligomers to be entrained by a stream of air. However, this kind of implementation is not achievable without complicating the overall mechanism and increasing the cost.

SUMMARY OF THE INVENTION

It is therefore an object of the present invention to prevent an image forming apparatus from producing incomplete images.

It is another object of the present invention to eliminate incomplete images by preventing contamination of various chargers which are installed in an image forming apparatus together with a heat roller type fixing device.

It is a specific object of the present invention to eliminate incomplete images ascribable to low-molecular weight siloxanes which are evaporated from a pressing roller of a heat roller type fixing device to adhere to chargers and the like and thereby whiten them.

It is another object of the present invention to provide a generally improved heat roller type fixing device and a method of producing the same.

In accordance with the present invention, in a heat roller type fixing device having a fixing roller and a pressing roller which is rotatable in pressing contact with the fixing roller and covered with silicone rubber, the device fixing a toner image to a toner carrier which is moved between the fixing roller and the pressing roller, 3- to 15-mer low-molecular weight siloxanes contained in the pressing roller have a content which is less than 300 parts per million.

A method of producing a pressing roller which is included in a heat roller type fixing device together with a cooperative pressing roller of the present invention comprises the steps of producing a core made of metal, applying a primer to the core, configuring the core into a roller by injection molding of silicone rubber, subjecting the roller to secondary vulcanization at a predetermined temperature for a predetermined period of time, and grinding the roller to a predetermined diameter.

BRIEF DESCRIPTION OF THE DRAWING

The above and other objects, features and advantages of the present invention will become more apparent from the following detailed description taken with the accompanying drawing in which.

DESCRIPTION OF THE PREFERRED EMBODIMENT

Figure 1:
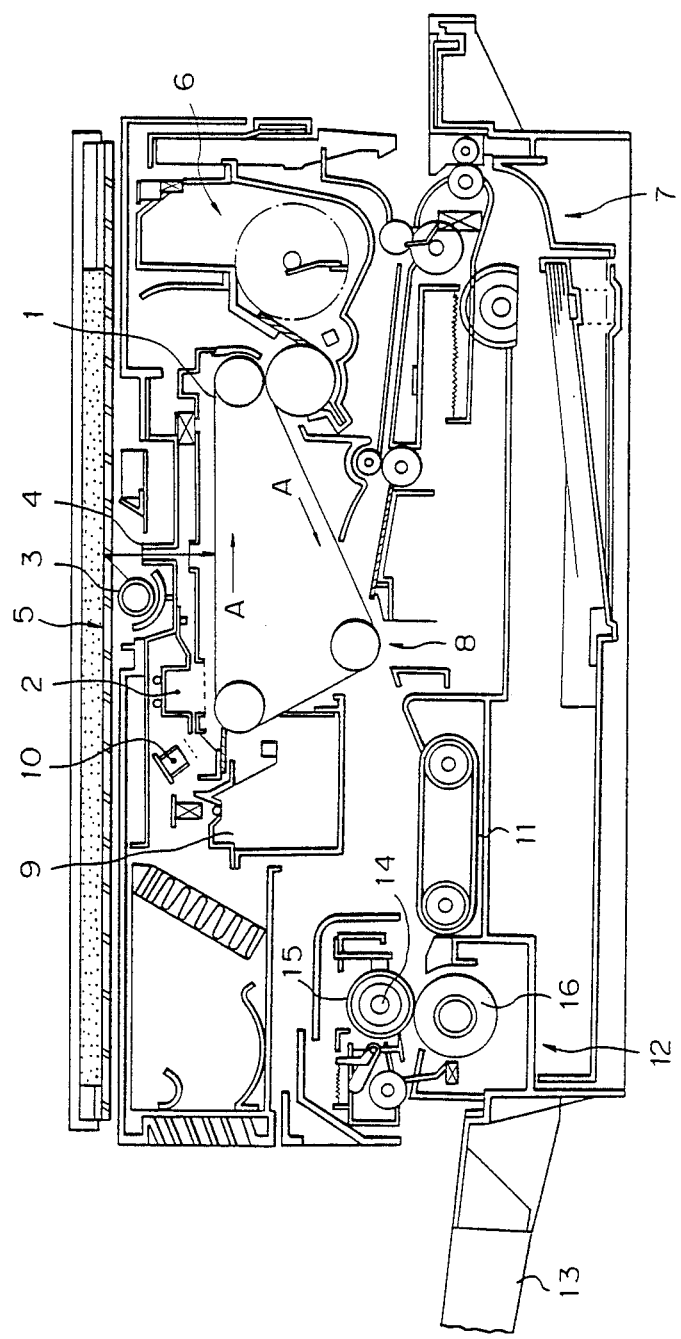
FIG. 1 as a single figure is a section showing a copier in which a heat roller type fixing device embodying the present invention is installed.

Referring to FIG. 1, an electrophotographic copier which is implemented by a fixing device in accordance with the present invention is shown. As shown, a photoconductive element 1 in the form of an endless belt is movable as indicated by an arrow A and uniformly charged by a charger 2. Optics which includes a lamp 3 and a focusing light conducting body 4 exposes the charged surface of the belt 1 to imagewise light which is representative of an image of an original document, thereby forming an electrostatic latent image on the belt 1. A developing device 6 develops the latent image to produce a visible image or toner image. At a predetermined transfer station where the belt 1 faces a transfer charger 8, the toner image is brought into register with a toner carrier or paper which is fed from a paper feed section 7 and then transferred to the paper by the discharge of the transfer charger 8. After such image transfer, toner remaining on the belt 1 is removed by a cleaning device 9, and the belt 1 is discharged by a discharger 10 and then charged by the charger 2 again. The paper carrying the toner image thereon is conveyed by a transport belt 11 to a heat roller type fixing device 12 resulting in the toner image being fixed on the paper. Then, the paper or copy is driven out of the copier to a copy tray 13.

The heat roller type fixing device 12 includes a fixing roller 15 and a pressing roller 16 which is pressed against the fixing roller 15. A heater 14 is built in the fixing roller 15 to heat the fixing roller 15. The toner image on the paper is fixed while the paper is moved through a nipping section between the rollers 15 and 16. Generally, the outer periphery of the pressing roller 16 is coated with silicone rubber in order to enhance the fixing ability. This, however, brings about a problem that the pressing roller 16 heated by the fixing roller 15 which itself is heated releases, among others, low-molecular weight siloxanes (oligomers) which are contained in silicone rubber. When adhered to the chargers 2, 8 and 10, the evaporated oligomers are burned to become $SiO_2$ with the result that the chargers 2, 8 and 10 are whitened. The whitening degree increases with the amount of oligomers evaporated and often increases to such an extent that the discharge of the various chargers becomes short and or irregular.

In the illustrative embodiment, the content of oligomers in the pressing roller 16 is less than 300 parts per million. This suppresses the evaporation of oligomers from the pressing roller 16 and thereby prevents the chargers 2, 8 and 10 from being whitened. For the analysis of the amount of oligomers, use may be made of gas-chromatography which is well known in the art. The pressing roller 16 having such a characteristic may be produced by preparing a core made of metal such as iron, stainless steel or aluminum, applying a primer to the core, roughly configuring the core with a primer into a roller by the injection molding of silicone rubber, subjecting the roller to secondary vulcanization at a predetermined temperature for a predetermined period of time, and grinding the roller to a predetermined dimension. It is to be noted that the temperature and duration of secondary vulcanization are open to choice. When secondary vulcanization was performed at 200° C. for 16 hours, the oligomer content was suppressed to 300 parts per million. If desired, the secondary vulcanization may be effected at a temperature lower than 200° C. for a duration longer than 16 hours or at a temperature higher than 200° C. for a duration shorter than 16 hours.

The oligomer content of 300 parts per million which is the criterion for the evaluation of the pressing roller 16 is derived from the results of a series of experiments I conducted. An example of the experiments is as follows.

A primer was applied to an iron core which had a diameter of 20 millimeters. A 5.1 millimeter thick layer of silicone rubber was formed on the iron core by injection molding, then hardened, and then subjected to secondary vulcanization. This was followed by grinding the resulting roller and finishing it to a diameter of 30 millimeters. The rubber was measured to have a hardness of 25 in terms of JIS (A) hardness. The secondary vulcanization was effected in a drier at 200° C. for 4 hours, 8 hours, 12 hours, 16 hours and 24 hours. Each of pressing rollers produced by such a sequence of steps was installed in the copier of FIG. 1 and operated to produce 10,000 copies. The whitening degrees of various chargers and the oligomer contents which are associated with the different vulcanization conditions are tabulated below.

| VULCANIZING CONDITION | CHARACTERISTIC | |
|---|---|---|
| | OLIGOMER CONTENT | WHITENING OF CHARGER |
| 200° C. 4 hours | 1300 | X |
| 200° C. 8 hours | 840 | X |
| 200° C. 12 hours | 500 | Δ |
| 200° C. 16 hours | 300 | O |
| 200° C. 24 hours | 80 | O |

In the above table, crosses, triangles and circles indicate "noticeable charger contamination (whitening)", "little charger contamination" and "no charger contamination", respectively.

As shown in the table, secondary vulcanization performed at 200° C. for 16 hours prevents chargers from being contaminated. The oligomer content associated with such a vulcanization condition is 300 parts per million.

While the oligomer content of the pressing roller 16 may be reduced to less than 300 parts per million by removing oligomers during the course of production of the roller 16, the same purpose is achievable even by removing it from polymer under a depressurized high temperature condition at a raw material stage, i.e. before vulcanization. When a pressing roller is produced by using such a polymer, the duration of secondary vulcanization required is reduced to about 4 hours resulting in a considerable decrease in the overall period of time necessary for the process.

In the silicone industry, 3- to 20-mer low-molecular weight siloxanes are usually called oligomers. Siloxanes which are highly volatile of course have low molecular weights. 16-mer and greater siloxanes are considered to have no influence on the whitening problem with which the present invention is concerned, and this has been confirmed by experiments. The whitening of chargers at the initial stage is generally accepted to be ascribable to 3- to 10-mers, and 10-mer and smaller oligomers are the issue. It follows that a favorable result is of course achievable with 3- to 10-mer oligomers the content of which is less than 300 parts per million.

In summary, it will be seen that in accordance with the present invention the amount of oligomers which is evaporated from a pressing roller is reduced to free various chargers from whitening which is causative of incomplete images.

Various modifications will become possible for those skilled in the art after receiving the teachings of the present disclosure without departing from the scope thereof.

What is claimed is:

1. In a heat roller type fixing device having a fixing roller and a pressing roller which is rotatable in pressing contact with said fixing roller and which is covered with silicone rubber, said device fixing a toner image to a toner carrier which is moved between said fixing roller and said pressing roller, the improvement which comprises;

said silicone rubber having a 3- to 15-mer low molecular weight siloxane content of less than 300 parts per million.

2. The heat roller type fixing device as claimed in claim 1, wherein said silicon rubber has a 3- to 10-mer low molecular weight siloxane content of less than 300 parts per million.

* * * * *